R. L. SMITH.
EMERGENCY SHUT-OFF VALVE.
APPLICATION FILED JUNE 30, 1917.

1,300,301.

Patented Apr. 15, 1919.

INVENTOR
Roscoe L. Smith
by Edward H. Wright
Atty.

able hammer upon the inlet side, the length
UNITED STATES PATENT OFFICE.

ROSCOE L. SMITH, OF BERWICK, PENNSYLVANIA.

EMERGENCY SHUT-OFF VALVE.

1,300,301.  Specification of Letters Patent.  Patented Apr. 15, 1919.

Application filed June 30, 1917. Serial No. 178,008.

*To all whom it may concern:*

Be it known that I, ROSCOE L. SMITH, a citizen of the United States, and a resident of Berwick, in the county of Columbia and State of Pennsylvania, have invented a certain new and useful Improvement in Emergency Shut-Off Valves, of which the following is a specification:

This invention relates to valve devices for automatically shutting off the flow of fluid through a pipe in case of an emergency, such as where a break occurs in the pipe, or system of piping connected thereto, at a point beyond said valve, and is adapted for use in connection with a steam, gas, water, oil, or other fluid distributing system.

The principal object of my invention is to provide an improved shut-off valve device actuated automatically by the reduction in pressure at the outlet side of the valve for closing the same when the pressure has reduced a given amount; and another object is to provide means for testing and adjusting the device to operate at a given reduction in pressure.

Figure 1:
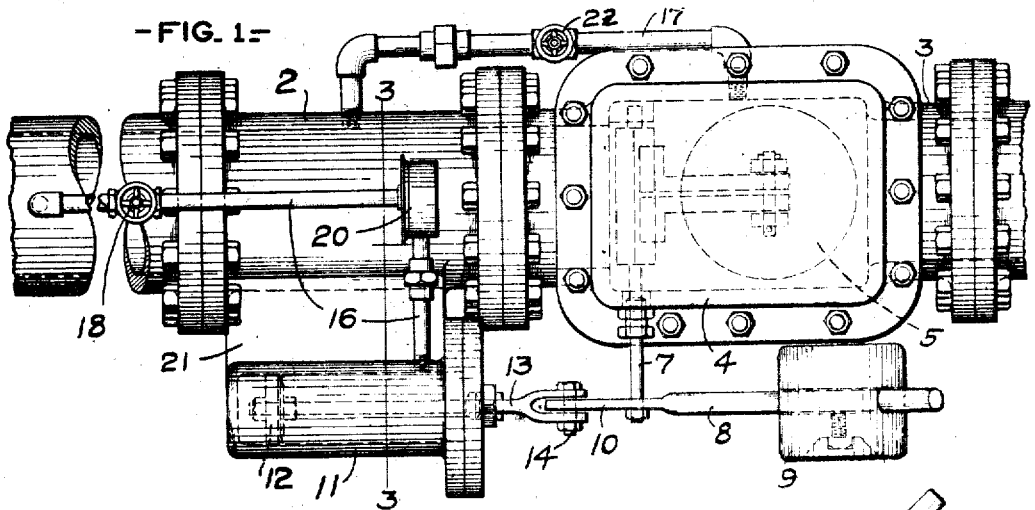
Figure 2:
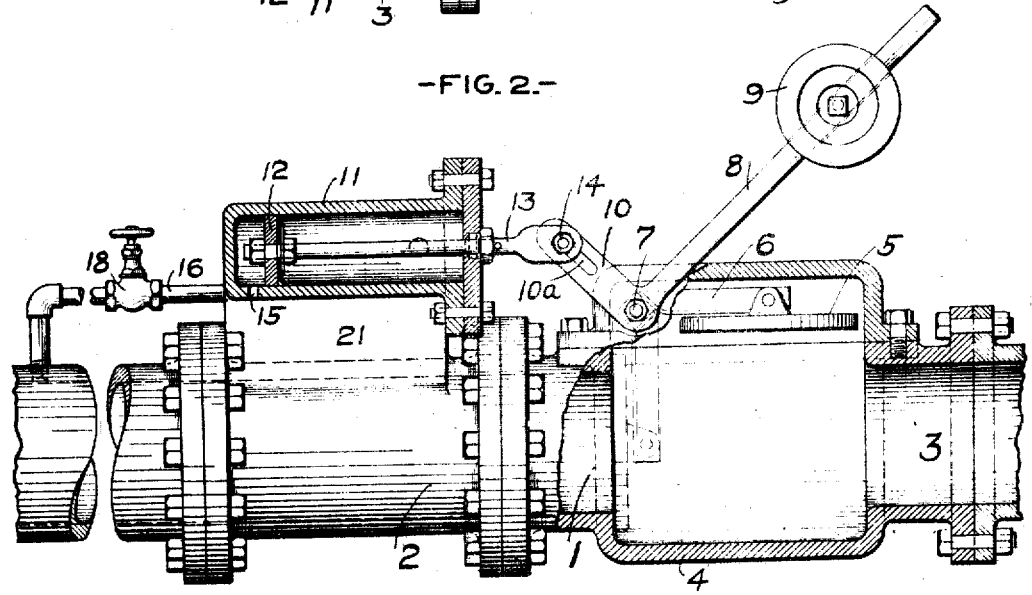
Figure 3:
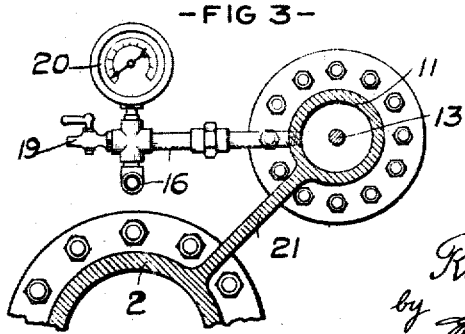

In the accompanying drawings, Figure 1 is a plan of a shut-off valve device embodying my improvement;

Fig. 2 a side elevation with the cylinder and valve casing shown in longitudinal section; and Fig. 3 a transverse section taken on the line 3—3 of Fig. 1.

According to the construction shown, the improvement is particularly adapted for use in connection with a water sprinkler system, the valve casing 4, having inlet 3, and outlet 1, communicating with outlet pipe 2, and containing the flat disk valve 5, pivotally mounted on the swinging arm 6, carried by shaft 7, having bearings in the casing and extending outside of the same.

On the shaft 7, outside the casing, is mounted a bent lever having a long arm 8, on which is mounted an adjustable weight 9, and a short arm 10, provided with an elongated slot 10ª. Alongside of the outlet pipe 2, is mounted a cylinder 11 having a piston 12 and rod 13 carrying pin 14 passing through the slot 10ª, of the lever arm 10. One end of the cylinder is open to the atmosphere through port 15, while the other end is connected by pipe or passage 16, with the outlet pipe, and preferably at some little distance from the valve. The cylinder 11 is preferably supported by an inclined flange or web 21, cast integral with the outlet pipe section 2, and is thus located parallel with the outlet and in the correct position for the piston rod 13, to engage the crank arm 10, on the shaft 7. A small by-pass 17, containing the normally closed valve 22, is also provided from one side of the valve to the other.

A testing device is also provided comprising a valve 18, for controlling the pipe 16, and a waste cock 19, and a pressure gage 20, connected to the cylinder or to the pipe 16.

When the system is charged and in its normal condition, the valve 5, stands in its open position, as indicated in Fig. 2, the fluid under pressure on the outlet side passing through pipe 16, into cylinder 11, where it acts on piston 12, to hold the weight 9, in its raised position with the valve open.

If a break should occur in the outlet pipe or its connections, or if for any other reason the pressure in the outlet pipe at the point where the pipe 16 is attached, diminishes to such a degree that, acting in cylinder 11, on piston 12, it is insufficient to overcome the weight 9, this weight then descends and automatically closes the valve 5, as indicated in dotted lines, Fig. 2, and further discharge of the water or fluid, which may be both wasteful and dangerous, is stopped.

In order to prevent a too sudden closing of the valve 5, and eliminate any undesirable hammer upon the inlet side, the length or size of the pipe 16 may be such as to create a certain amount of friction to the passage of fluid and thereby retard the outflow from the cylinder 11, to any desired degree; thus producing a corresponding cushioning effect to the closing movement of the valve.

When the device has thus been automatically closed and it is desired to reopen valve 5, to its normal position, this is done by opening the by-pass valve 21, whereupon the fluid from the inlet side 3, will flow through the by-pass 17, to the other side of the valve where it will again build up the pressure, and as soon as this pressure acting on piston 12, is sufficient to raise the weight 9, the valve 5, is automatically opened. The by-pass valve 21 may then be closed.

In some systems, such as a water sprinkler system, where the valve 5 may become closed due merely to a temporary fall in pressure in the supply mains, and it is desired that the valve shall automatically open again when the pressure is restored, the by-pass valve 21 may be left normally open or it may be omitted altogether. In such cases the very small discharge which may occur through the bypass, where there has been a break in the outlet pipe, will not be seriously objectionable.

In order to test the device and determine that the same will close upon a certain reduction in pressure upon the outlet side, the cock 18, in pipe 16, may be closed, and the waste cock 19, opened sufficiently to permit the pressure acting upon piston 12, in cylinder 11, to drop the desired amount, as shown by the pressure gage 20. If the weight 9, is properly adjusted it will then close the valve 5, but if not the weight may be readily adjusted on the lever arm 8, to such position that the valve will close.

It will now be seen that I have provided a very simple and compact structure with few parts and not liable to get out of order. This makes a very reliable device and one which may always be depended upon to operate automatically to shut off the flow of fluid in an emergency, or when the pressure upon the outlet side has reduced a given amount due to a discharge of fluid therefrom.

Having now described my invention, what I claim as new and desire to secure by Letters Patent is:

1. In an emergency shut-off apparatus, the combination of a valve casing; a swing valve closing in the direction of the flow; a shaft for the valve extending outside of the casing and having a crank arm; a cylinder; a piston therein subject to the fluid pressure from the outlet side of the valve and having a rod connection to the crank for holding the valve open; a weighted lever arm tending to close the valve; and a hand controlled bypass for admitting fluid from the inlet side around the valve to the outlet side.

2. In an emergency shut-off apparatus, the combination of a valve casing; a swing valve closing in the direction of the flow; a fluid pressure device subject to the pressure from the outlet side of the valve, and having a connection for holding said valve open; a manually adjustable means acting in opposition to said fluid pressure and tending to close the valve; a waste cock for reducing the pressure acting on said device for test purposes; and a gage for indicating the pressure on said device.

3. In an emergency shut off apparatus, the combination of a valve casing and valve for controlling the flow, a shaft for the valve extending outside the casing and having a crank arm, a pipe section connected to the valve casing, a cylinder having an inclined web formed integral with the pipe section and supporting the cylinder parallel therewith, a piston, a rod connecting the same with the crank arm for holding the valve open, and a weight tending to close the valve.

In testimony whereof I have hereunto set my hand.

ROSCOE L. SMITH.